United States Patent Office 2,798,891
Patented July 9, 1957

2,798,891

SEPARATION OF ORGANIC COMPOUNDS BY FORMING CLATHRATES WITH WERNER COMPLEXES

William D. Schaeffer, Ontario, Calif., assignor to Union Oil Company of California, Los Angeles, Calif., a corporation of California No Drawing. Application February 1, 1954,
Serial No. 407,572

41 Claims. (Cl. 260—674)

This invention relates to methods for separating organic compounds which differ in molecular configuration, particularly compounds which have similar chemical and physical properties, and are therefore difficultly separable by conventional methods such as fractional distillation and recrystallization. Broadly stated, the method consists in selectively absorbing the desired compound or compounds into a solid Werner-type complex of a metal salt and an organic nitrogen base. The absorption is accomplished by contacting the solid complex with the mixture of organic compounds to be separated. Present experimental evidence points toward the theory that those compounds whose molecular configurations most nearly coincide with the crystal-lattice voids of the complex are selectively absorbed thereby forming what is regarded as a "clathrate" type compound. The clathrate is then separated from the remaining liquid and heated or otherwise decomposed to liberate the absorbed components. The liberated organic phase will be found to be substantially richer in compounds corresponding to one particular molecular configuration than was the original mixture.

The methods described herein are particularly valuable for separating hydrocarbon isomers, and aromatic isomers in general. Such isomers for example as meta- and para-xylene are especially difficult to separate by conventional methods. Their boiling points are very nearly the same, and separation by distillation and fractionation is therefore not practical, nor do azeotropes of these compounds display a sufficient difference in boiling point to permit effective fractionation. Some degree of resolution may be obtained by fractional recrystallization, but repeated crystallizations are necessary with correspondingly low yields in order to obtain any one of the components in reasonably pure form. Obviously also, the chemical properties of such isomers are so nearly identical as to render separation by conventional chemical procedures very difficult. Moreover, most of the heretofore proposed chemical separation processes, such as selective sulfonation, are inherently uneconomical.

Aliphatic isomers, and isomers containing functional groups such as nitro, amino, halogen, hydroxyl, oxo, or carbonyl, for example, sometimes present similar difficulties in separation, but may generally be resolved by the present methods. In addition to isomers, other mixtures of difficultly separable compounds may be resolved into their components, such as for example narrow boiling range mixtures of aliphatic, aromatic and naphthenic hydrocarbons.

It is therefore an object of this invention to provide economical means for separating mixtures of two or more organic compounds which are difficult to separate by ordinary physical or chemical methods.

Another object is to provide a physico-chemical method for separating two or more organic compounds whose molecules differ primarily in dimensions or spatial configuration.

Still another object is to provide Werner complexes having suitable crystal-lattices for the selective absorption of one organic compound from a mixture thereof with other components.

Another object is to provide economical methods for recovering the selectively absorbed components from the Werner complexes.

A specific object is to provide economical means for separating hydrocarbon isomers of closely similar structure such as meta- and para-xylene.

Other objectives will be apparent from the more detailed description which follows.

The present invention is based upon the discovery that certain crystalline Werner complexes are capable of selectively absorbing or occluding, either during or after formation of their crystalline structure, certain organic compounds, while other organic compounds of similar gross physical properties are absorbed to a much smaller extent, or not at all. The theoretical explanation for this phenomenon is not known with certainty, but present information indicates that a "clathrate" type compound may be formed with the absorbed organic compound. These clathrates, when saturated with the absorbable compound at any given temperature, are found to contain the absorbed component in a constant proportion or combining ratio, wherein, however, such combining ratio is not necessarily that of any integer. Present evidence indicates that the absorbed component is occluded within the voids of the crystal lattice, and the selectivity of absorption implies that there is an optimum molecular configuration of absorbate for maximum absorption in a particular crystal lattice. In the present case, the Werner complexes employed are found to favor, for the most part, the absorption of para compounds over the ortho- or meta-isomers, and relatively branched-chain aliphatics as opposed to relatively straight-chain aliphatics of the same or similar molecular weight. However, by suitably modifying the constituents of the Werner complex employed, this order may be reversed so that meta- and ortho-compounds may be selectively absorbed in preference to the para-isomers, and straight-chain aliphatics in preference to branched-chain.

The Werner complexes employed herein are made up of at least three components. The fundamental unit is a metal having an atomic number above 12 which is capable of forming coordinate complexes of the Werner type. This includes primarily the metals of groups IB, IIB, VIB, VIIB, and VIII of the periodic table, such for example as iron, cobalt, nickel, copper, zinc, cadmium, silver, manganese, chromium, mercury, and molybdenum. Aluminum may also be used in some instances. The preferred metals are those of atomic number 25 to 28 inclusive, i. e. manganese, iron, cobalt and nickel.

The second component consists of one or more organic nitrogen bases which are bound to the central metal atom through coordinate bonds. The complexes are mainly of the tetra- and hexa-coordinate types, wherein the metal atom is coordinated with four or six molecules of the nitrogen base to form a positive radical which is usually divalent. Examples of suitable nitrogen bases are set forth hereinbelow.

The positive radical (metal plus nitrogen base) is in turn combined electrovalently with a suitable negative radical, such for example as thiocyanate NCS—, isothiocyanate SCN—, azide NNN—, cyanate NCO—, isocyanate OCN—, cyanide NC—, sulfate $SO_4=$, nitrate $NO_3$—, nitrite ONO—, chloride Cl—, bromide Br—, iodide I—, phosphate $PO_4\equiv$, formate HCOO—, acetate $CH_3COO$—, and the like. A group of negative radicals found to be particularly effective for the present purposes consists of the monovalent radicals thiocyanate, isothiocyanate, azide, cyanate, isocyanate and cyanide. However, any radical may be utilized which is capable of producing a crystalline complex with the above positive radical, which complex will exhibit the desired selectivity for the particular isomer or compound which is to be absorbed. Such complexes are described generally in Modern Aspects of Inorganic Chemistry, Emeleus and Anderson, 79–178, Van Nostrand Co., 1946, and also in Textbook of Inorganic Chemistry, vol. X, M. M. J. Sutherland, J. P. Lippincott Co. 1928. These references also described general methods which may be employed for preparing the particular complexes employed herein.

The Werner complexes concerned herein may be designated by the following general formula:

$$[X.Z_y.A_n] \quad (I)$$

wherein X is the metal atom as defined above, Z is the basic nitrogen compound, $y$ is a number from 2 to 6, A is the negative radical as above defined, and $n$ is a number from 1 to 3.

The nitrogen bases employed in the above formula should be such as to give a maximum selective absorption for the particular isomer which is to be absorbed into the crystal lattice of the complex. For example, if it is desired to absorb p-xylene, a very suitable nitrogen base is gamma-picoline. Not all nitrogen bases are equally effective in forming complexes which will absorb the desired component. For example, the beta-picoline complex with nickel thiocyanate is not as effective as the gamma-picoline complex for absorbing para-xylene, presumably because of the steric effects of the 3-methyl group. However, the beta-picoline complex may be used advantageously for absorbing other compounds. The nitrogen bases should therefore be selected by a judicious combination of theoretical reasoning and actual testing of the complexes with the particular mixture to be separated. The over-all molecular dimensions of the nitrogen base should in most cases approximate the molecular dimensions of the compound to be absorbed in the complex. Suitable nitrogen bases for various applications include for example mono-, di- and trialkyl amines, arylamines, mono- and di- N-substituted arylamines, aminonaphthenes, heterocyclic amines such as pyridine, substituted pyridines, pyrrole, substituted pyrroles, piperidines, polyamines such as ethylene diamine, and amines containing other non-interfering functional groups. A particularly preferred class of organic bases are the heterocyclic, resonance-stabilized bases which contain one to three hetero-N atoms. Suitable examples are pyridine, the picolines, pyrrole, pyrazole, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4 disubstituted pyridines. These compounds are sufficiently strong bases to form relatively stable Werner complexes, and the resulting complexes are capable of selectively forming clathrates with a wide variety of organic compounds. Suitable substituted pyridines comprise the following:

4-methyl pyridine
4-ethyl pyridine
4-n-propyl pyridine
4-isopropyl pyridine
4-n-butyl pyridine
4-n-hexyl pyridine
4-vinyl pyridine
4-fluoro pyridine
4-chloro pyridine
4-bromo pyridine
4-hydroxy pyridine
4-hydroxymethyl pyridine
4-methoxy pyridine
4-amino pyridine
Methyl isonicotinate
4-cyano pyridine
4-acetyl pyridine
4-chloromethyl pyridine
3-methyl pyridine
3-ethyl pyridine
3-n-propyl pyridine
3-isopropyl pyridine
3-n-butyl pyridine
3-vinyl pyridine
3-chloro pyridine
3-hydroxy pyridine
3-methoxy pyridine
3-acetyl pyridine
3-cyano pyridine
Ethyl nicotinate
3,4-dimethyl pyridine
3,4-diethyl pyridine
3-methyl, 4-ethyl pyridine
4-methyl, 3-ethyl pyridine
4-methyl, 3-n-hexyl pyridine
4-methyl, 3-cyano pyridine
4-chloro, 3-methyl pyridine
4-acetyl, 3-methyl pyridine
4-methoxy, 3-ethyl pyridine
Isoquinoline Many other similar examples could be cited, as will be apparent to those skilled in the art, and the complexes may include only one such base, or a mixture of two or more may be employed, in which case a mixed complex is formed.

Examples of suitable complexes which may be employed, corresponding to Formula I above, are as follows:

[Ni($\gamma$picoline)$_4$(SCN)$_2$]
[Cu($\gamma$picoline)$_4$(SCN)$_2$]
[Hg($\gamma$picoline)$_4$(NNN)$_2$]
[Ni(1-hexylamine)$_6$(SCN)$_2$]
[Co(pyridine)$_4$(OCN)$_2$]
[Fe(pyrrole)$_4$(SCN)$_2$]
[Cd($\gamma$picoline)$_4$(CN)$_2$]
[Ag($\gamma$picoline)$_2$(NNN)]
[Zn(aniline)$_4$(CN)$_2$]
[Cr(pyridine)$_4$SO$_4$]
[Ti(isoquinoline)$_3$(NH$_3$)$_3$(C$_2$O$_4$)$_2$]
[Ni(4-methylpyridine)$_4$Cl$_2$]
[Ni(4-methylpyridine)$_4$(N$_3$)$_2$]
[Ni(4-n-propylpyridine)$_4$(SCN)$_2$]
[Ni(hexamethylenetetramine)$_2$(SCN)$_2$]
[Ni(isoquinoline)$_4$Cl$_2$]
[Ni(4-methylpyridine)$_4$Br$_2$]
[Mn(4-methylpyridine)$_4$(SCN)$_2$]
[Mn(isoquinoline)$_4$(SCN)$_2$]
[Zn(4-methylpyridine)$_4$Cl$_2$]

Obviously many other compounds similar to the above could be employed, not all of which would give effective or optimum separation of all isomer pairs, but which should be selected to meet the specific peculiarities of the feed mixture to be resolved.

The complex compounds defined by Formula I above are mostly insoluble, or only slightly soluble in aqueous solutions, insoluble or slightly soluble in hydrocarbon solvents, and moderately or readily soluble in polar organic solvents such as halogenated hydrocarbons, ethers, aliphatic or aromatic nitro compounds, mono- or polyhydroxy compounds, esters, ketones, aldehydes, etc. These solubility properties make possible at least three different general methods for forming the final clathrate with the isomer or compound to be absorbed in the crystal lattice.

According to one method the dry complex may first be formed by any conventional method such as precipitation from an aqueous solution. This precipitation is ordinarily accomplished by first forming in solution the desired metal salt containing the X and A components of Formula I. To this solution is then added from about two to six molar equivalents of the desired nitrogen base Z. The insoluble Werner complex thereupon precipitates and is removed and dried. The drying may be accomplished in a stream of air at room temperature, or slightly elevated temperatures may be employed. The substantially dry, powdered or granular complex may then be contacted directly with the mixture of compounds to be separated in any suitable manner, as for example by allowing the feed mixture to percolate through a bed of the complex, or by stirring the mixture for several minutes at substantially any desired temperature. The clathrate so formed is then separated and treated for recovery of the absorbed materials as hereinafter described. In contacting the feed mixture with the solid complex, it may be desirable to dilute the feed with an inert solvent such as pentane, decane and the like, or an immiscible dispersing agent such as water, in order to provide adequate contact, and to facilitate agitation.

If desired the absorption may be performed in a continuous manner, for example by flowing the feed mixture upwardly through a column and the complex downwardly in countercurrent fashion. This procedure is analogous to countercurrent solvent extraction, the principles of which are well understood by those skilled in the art. Various reflux procedures may be employed, and suitable baffling or agitating mechanisms may be provided in the column in order to provide an adequate contact time between complex and feed material.

According to a second possible method for forming the clathrate, the dry complex prepared as outlined above, or by any of the conventional methods, is first dissolved, preferably to saturation, in a polar solvent such as chloroform, ethylene glycol, propylene glycol, methyl Cellosolve, butyl Cellosolve, glycerol ethers, ethanol, methanol, and the like. In this procedure it is important to note that the solvent employed should have a molecular size or configuration sufficiently different from the compound to be preferentially absorbed to avoid any appreciable absorption of the solvent molecules into the crystal lattice. The feed mixture to be separated is then added to the solvent-complex solution, whereupon a crystalline precipitate forms, either spontaneously or upon cooling, which is filtered off and freed of solvent. This precipitate, or clathrate, will be found to contain a substantial proportion, about 5-50% by weight in the case of p-xylene, of clathrated organic compounds. The clathrated compounds may be freed from the clathrate by various methods which will be described hereinafter. The mixture recovered from the clathrate will be found to contain a significantly higher proportion of compounds corresponding to one molecular configuration than did the original mixture. The portion of feed not absorbed into the clathrate remains in the solvent and may be recovered by distillation, or other known methods. This method is particularly valuable for separating solid compounds having relatively high melting points.

A third general method for forming the clathrates described herein consists in simulaneously precipitating, i. e. forming, the complex from an aqueous solution or any other type of solution, and absorbing the desired organic isomer therein during the initial precipitation. This may be accomplished by first forming the desired salt containing the X and A constituents of Formula I in aqueous solution for example, and then adding to the solution a mixture of the desired nitrogen base and the isomers or other feed mixture to be separated. If an organic nitrogen base is employed, the organic isomers will generally be miscible therewith, and the mixture is added to the salt solution as a homogeneous solution. If the nitrogen base is not miscible with the feed, an emulsion may be formed, either with or without an added emulsifying agent, and the emulsion added to the salt solution. In either case, the mixture of nitrogen base and feed mixture should be added to the salt solution with sufficient agitation to insure adequate contact between any phases that may be formed. The solid material which settles out is then removed, washed if desired, and decomposed as hereinafter described to liberate a clathrated phase substantially enriched in one component of the feed mixture. The unabsorbed feed components usually form a supernatant lean phase on the aqueous solution which may be removed by decantation.

Alternatively, the nitrogen base may be added separately, either before or after addition of the feed mixture to the aqueous salt solution.

By repeating any of the above absorption or clathrating steps upon the concentrated isomer or isomers obtained from the first clathrating step, a further substantial concentration of the desired isomer may be obtained. Similarly the lean residue of unabsorbed isomers may be repeatedly subjected to clathrating to further reduce its absorbable components.

The amount of complex employed, relative to the feed mixture, depends upon its specific capacity for absorbing the particular isomer concerned, and also upon the proportion of that isomer present in the original mixture as well as upon the temperature of clathration. The complexes are found in general to be capable of absorbing between about 5% to 70% by weight of absorbable compounds. Optimum efficiency may require that more or less than this "stoichiometric" amount of complex be employed, depending upon its relative capacity for other components in the mixture to be resolved, and the number of absorption cycles or stages which are permissible. In general, the amount of complex to be employed may vary between about 0.25 and 20 parts by weight per part of absorbable component in the mixture, at optimum temperatures as hereinafter described. Smaller proportions of complex will generally yield a purer absorbate, while the larger proportions result in more complete removal of absorbate from the feed mixture, on the basis of a single-stage batch absorption.

The term "clathrating" as used herein is intended to mean any absorption or adsorption by the herein described Werner complexes of a sorbable organic compound, regardless of the mechanism by which such sorption may take place. The term "absorbate" refers to the total organic component which is absorbed into the clathrate, thus excluding the nitrogen bases, which are bound by coordinate valences. The term "aromatic" is intended to include all resonance-stabilized cyclic unsaturated compounds, which exhibit predominantly substitution rather than addition reactions toward electrophilic reagents. (Cf. Remick A. E., Electronic Interpretations of Organic Chemistry, John Wiley, N. Y. 1943.)

The clathrates prepared by any of the above absorption methods may be treated in several different ways for separating the absorbed component. In the interest of economy it is preferable to recover the absorbed component without destroying or changing essentially the particular complex employed. One such method which is eminently suitable consists in steam stripping or steam distilling the solid clathrate after separation from the fluid phases. By this method practically all of the absorbed component may be recovered as overhead which is condensed to give usually a two-phase condensate consisting of water in one phase and absorbate in the other. This method is found to cause little or no decomposition of the complex, which is thus in good condition for recycling to another absorption stage. In some cases it may be desirable to dehydrate the complex before recycling.

Alternatively, the clathrates may be stripped with vapors other than steam, such as example as various petroleum fractions, alcohols, ethers, nitro compounds, chlorinated hydrocarbons. This procedure is similar to azeotropic distillation, and the stripping agent should be one which is easily separable from the entrained absorbate.

Other methods for recovering the absorbate include distillation under reduced pressure, preferably below 50 mm., at temperatures from about 50°–150° C.

It is not essential however to vaporize the clathrated component in order to recover it from the clathrate. As will be shown hereinafter, merely heating the clathrate, without vaporizing any of the components thereof, results in freeing a large proportion of the clathrated component. Merely freeing the component from its clathrate "cage" does not however automatically effect its recovery, since it will ordinarily remain adsorbed on the surfaces and pores of the solid. To effect recovery the crystals may be washed with an entrainer which may be either a hot solvent for the liberated component in which the Werner complex is insoluble, or an immiscible entrainer in which neither the liberated component nor the Werner complex is appreciably soluble. Suitable solvent entrainers include for example aliphatic and naphthenic hydrocarbons such as pentane, decane, kerosene, solvent naphtha and the like, benzene, toluene, acetone, ethers, alcohols, chlorinated hydrocarbons and the like. Suitable immiscible entrainers include for example water, and mixtures of water with other organic compounds such as ethanol, methanol, ethylene glycol, methyl Cellosolve and the like. In employing an immiscible entrainer it is preferably to employ vigorous agitation to dislodge the liberated component from the solid and keep it dispersed in the liquid. If desired a small percent e. g. 0.1–5% of an emulsifier may be added to the entrainer, such for example as sodium lauryl sulfate, sulfonated dodecyl benzene salts, ethanolamine oleate, and the like.

In still another method for recovery, the entire solid clathrate may be dissolved in a solvent, thereby mechanically freeing the clathrated compound. The solvent may either partially or completely dissolve the Werner complex. The formerly clathrated component may then be recovered from the solution by distillation, steam distillation, azeotropic distillation, cooling to form a separate liquid or solid phase which is physically separable from the solvent by decantation, filtration or centrifuging or similar procedures. Suitable solvents for this purpose comprise the aliphatic alcohols, glycols, glycol monoethers, glycerol mono- and diethers, and mixtures of these and similar compounds. Alternatively, the clathrate may be decomposed by treatment with a solvent which dissolves the Werner complex but not the clathrated component, which is hence recovered by phase separation.

Any of the above described recovery methods may be modified to effect substantial rectification of the absorbed component simultaneously. Where more than one compound has been absorbed into the clathrate, and where one of the compounds is more strongly clathrated than the others, it is found that steam distillation, vacuum distillation, solvent extraction, or washing with an immiscible dispersing agent, will preferentially remove the components which are less readily clathrated, or are merely adsorbed on the surface and interstices of the clathrate. The first fractions obtained from such recovery procedures may thus be segregated from the later fractions, the latter of which will contain the more readily clathrated component in purer form than the first fractions. The first fractions may then be recycled to another clathration stage, with or without fresh feed material, if desired.

If it is desired to wash the clathrate to remove the interstitial liquid adhering thereto by adsorption or capillarity without effecting substantial rectification of the clathrated components, the washing, with either a solvent or an immiscible dispersing agent, should be carried out at or below the temperature at which clathration was carried out. Also, if a solvent is employed, it should preferably contain at least an equilibrium proportion of the clathrated compound, as will be evident from the discussion of equilibria presented hereinafter. If rectification of the clathrated components is desired, the washing, with either a solvent or dispersing agent, may be carried out at slightly above, e. g. 10–15° C. above, the temperature of clathration, and in the case of solvent-washing at least an equilibrium proportion of the clathrated component may be present in the solvent, while less than the equilibrium proportion of the component to be selectively de-clathrated should be present.

The formation and decomposition of clathrates by any of the methods described herein are found to be equilibrium phenomena wherein the position of equilibrium varies substantially with the ambient temperature. The reaction may be generalized as follows:

$$xWC + yAC \rightleftharpoons zCC \qquad (1)$$

wherein:

$WC$ = Werner complex
$AC$ = absorbable compound
$CC$ = clathrate compound
$x, y, z$ = numbers The values for $x$, $y$ and $z$ vary appreciably with temperature; high temperatures shift the equilibrium to the left, and low temperatures shift it to the right. Hence, for optimum efficiency, the temperature of clathration should be as low as other practical considerations will permit. Conversely, when it is desired to recover the clathrated component from the clathrate, temperatures as high as practical considerations permit should be employed in order to shift the equilibrium to the left.

The equilibrium constant, $K_{eq}$ for Equation 1 may be expressed in terms of activities as follows:

$$K_{eq} = \frac{(A_{cc})}{(A_{ac})(A_{wc})} \qquad (2)$$

wherein:

$A_{cc}$ = activity of the clathrate compound.
$A_{ac}$ = activity of the absorbable compound.
$A_{wc}$ = activity of the Werner complex.

If the absorbable compound AC is introduced in a homogeneous liquid phase, or in a liquid phase dispersed in a medium that has essentially no solvent capacity for any of the reactants, then $A_{cc}$ and $A_{wc}$ are equal to unity, because the activities of the solid reactants in such a system are by definition unity. Under such conditions $K_{eq}$ is defined by the following equation:

$$K_{eq} = \frac{1}{A_{ac}} = \frac{1}{(X_{ac})(\gamma_{ac})} \qquad (3)$$

wherein:

$X_{ac}$ = mole fraction of AC in the liquid phase at equilibrium, and
$\gamma_{ac}$ = activity coefficient of AC in the liquid phase at equilibrium.

When isomeric mixtures comprise the sole liquid phase with which the solid phases are in equilibrium, the mole fraction $X_{ac}$ and the activity coefficient $\gamma_{ac}$ may be considered to be identical without introducing appreciable error, and Equation 3 may then be reduced to Equation 4:

$$K_{eq} = \frac{1}{X_{ac}} \qquad (4)$$

or in other words the equilibrium constant is equal to the reciprocal of the mole-fraction of AC in the liquid phase at equilibrium.

The mole-percent recovery R of an absorbable compound AC from isomeric mixtures may be calculated from the previously determined values for $K_{eq}$ by the equation:

$$R = \frac{(X_{ac}^{0} \cdot V^{0}) - (X_{ac}^{eq} \cdot V^{eq})}{(X_{ac}^{0} \cdot V^{0})} \times 100$$

wherein:

$X_{ac}^0$ = initial mole-fraction of AC;

$V^0$ = initial volume of isomers treated;

$X_{ac}^{eq}$ = equilibrium mole-fraction of AC in liquid phase;

$V^{eq}$ = equilibrium volume of isomers.

The following table illustrates the marked variation of $K_{eq}$, and hence of the mole-percent recovery, R, when a 2.5% solution of p-xylene in n-heptane is equilibrated at various temperatures against a stoichiometric excess of the Werner complex nickel-tetra-(4)-methylpyridine)-dithiocyanate. The n-heptane is present merely as an inert diluent and takes no part in the reaction:

Table 1

| Temp., ° C. | $K_{eq}$ | Initial mole-fraction of p-xylene, $X_{ac}^0$ | Equil. mole-fract. p-xylene, $X_{ac}^{eq}$ | Mole-percent Recovery R |
|---|---|---|---|---|
| 15 | 161 | 0.2 | 0.00621 | 96.9 |
| 30 | 98 | 0.2 | 0.0102 | 94.9 |
| 65 | 29 | 0.2 | 0.0345 | 82.7 |
| 120 | 5.81 | 0.2 | 0.172 | 14.0 |

From the above data, it can be seen that there is a distinct advantage in carrying out the clathration at low temperatures, e.g. below about 85°, and preferably below about 65° C., other factors being equal. Conversely, the data indicates that a large proportion of the clathrated compound may be liberated from the clathrate by raising the temperature to e.g. above 65° and preferably above about 100° C. To recover the liberated p-xylene, an inert solvent entrainer or dispersing agent entrainer may be employed. If a solvent entrainer is employed it should be readily separable from the p-xylene, and should preferably have a low solvent capacity for the solid Werner complex. Suitable solvents include for example aliphatic hydrocarbons, e.g. pentane, hexane, decane, kerosene, solvent naphtha, and the like. The term "dispersing agent" includes such materials as water, glycols and the like, in which the p-xylene, or other clathratable compound, and the Werner complex, are substantially insoluble, at least at the temperature of recovery. To actually effect recovery, the clathrate plus the solvent entrainer or dispersing agent entrainer are heated at above the temperature employed for clathration, and preferably agitated, until the new equilibrium is established. The liquid phase or phases are then separated from the solid phase and the former is treated for recovery of the p-xylene, as e.g. by distillation or liquid-liquid phase separation.

The above discussion of clathrate formation and decomposition has considered only the ultimate possible recovery, or in other words the ultimate position of equilibrium, and does not take into account other important factors such as reaction velocities, and the mechanical problem of providing adequate contact between phases. In the initial clathration, the feed mixture will ordinarily contain at least about 10%, and sometimes as much as 90% by volume of the absorbable compound e.g. p-xylene. Such mixtures obviously do not provide sufficient inert extending materials to distribute the p-xylene evenly over the entire quantity of solid Werner complex. To overcome this problem an inert solvent or a dispersing agent may be employed, each of which presents peculiar advantages and disadvantages. If a solvent is employed such as pentane or decane, the mole-fraction and hence the activity of p-xylene in the initial liquid phase is lowered, thereby lowering the recovery. Such solvents do however increase the speed of reaction. If a dispersing agent such as water is employed, there is no lowering of the initial p-xylene activity, and recoveries are hence high, but the time required to attain equilibrium is increased, as compared to the use of a solvent. The relative merits of these two methods must be weighed for each specific feed mixture to be separated, and to meet the desired process requirements, as will be understood by those skilled in the art. In some cases it may be desirable to obtain part of the advantages of each method by employing a reaction medium in which the feed mixture is slightly or partially soluble. Such media include for example glycols, mixtures of ethanol and water, methanol and water, ethanol and aliphatic hydrocarbons, glycols and water, methyl Cellosolve and water, butyl Cellosolve and water, glycols and aliphatic hydrocarbons, acetone and water, methyl-ethyl ketone and water, esters and aliphatic hydrocarbons, and the like.

As indicated above, low temperatures favor the formation of clathrates. This desirable factor is sometimes counterbalanced by an undesirable increase in viscosity and/or decrease in reaction rates. Therefore in some cases it is desirable to use slightly higher temperatures than are optimum, equilibrium-wise, and/or to employ a thinner in case the liquid phase of the reaction mixture becomes too viscous.

Other methods of recovering the absorbate which involve decomposition of the complex may be employed. Such methods include for example decomposition with acid or heat. If aqueous acid is used, the absorbate will usually form a separate phase and the nitrogen base goes into solution as a salt. The salts may subsequently be recovered. In thermal decomposition, part of the nitrogen base may volatilize along with the absorbate. Temperatures above about 100° C., at atmospheric pressures, generally result in liberation of part of the nitrogen base along with the absorbate.

The methods described herein are particularly adapted for the separation of hydrocarbon isomers such as occur in petroleum fractions, and more especially aromatic isomers. Thus the alkanes may be separated into relatively straight-chain and relatively branched-chain fractions. The aromatic and naphthenic para-isomers may be separated from the ortho- and meta-isomers. Cyclohexane may be separated from other hydrocarbons, including isomers such as methyl cyclopentane. Moreover, narrow boiling range mixtures of aromatic and aliphatic hydrocarbons, aromatic and naphthenic hydrocarbons, naphthenic and aliphatic hydrocarbons, and mixtures of all three types, may be separated even though the components of the mixtures are not isomeric.

A particularly valuable operation consists in subjecting a full-range or narrow-cut gasoline fraction to clathration, whereby the p-xylene, and other p-isomers are selectively clathrated. Such gasoline fractions may be derived from straight-run, cracked, or reformed stocks. Higher boiling stocks, e. g. in the kerosene or lube-oil range, may also be subjected to clathration to recover compounds corresponding to any desired type of molecular configuration.

In order to further illustrate the invention the following examples are cited, which should be considered as illustrative only and not limitative.

EXAMPLE I

An aqueous solution of nickel thiocyanate was prepared by adding two molar equivalents of potassium thiocyanate to a 10% solution of nickel chloride. To the resulting solution was added in step-wise fashion with stirring at about 25° C., a solution comprising four molar equivalents of gamma picoline (relative to the nickel chloride) in approximately its own weight of a mixture of aromatic hydrocarbons having the composition listed in Table 2 after feed mixture. Upon completion of the addition a blue precipitate settled to the bottom, and a lean hydrocarbon layer rose to the top. The precipitate was removed by filtration drained, evaporated in an air stream to constant weight, and decomposed in aqueous hydrochloric acid. Upon standing, an enriched hydrocarbon layer formed on top of the aqueous acid which was removed by decantation and analyzed. The results were as follows:

Table 2

|  | p-Xylene | m-Xylene | o-Xylene | Ethyl-benzene |
| --- | --- | --- | --- | --- |
| Feed Mixture, percent by volume | 18.1 | 57.9 | 13.0 | 11.0 |
| Enriched hydrocarbon layer, percent by volume | 68.4 | 20.9 |  | 10.7 |
| Lean hydrocarbon layer, percent by volume | 12.1 | 58.8 | 18.1 | 11.0 |

From the above data it will be seen that by a single absorption step, the concentration of p-xylene in the recovered hydrocarbon fraction is more than tripled. Repeated absorptions performed on either the enriched hydrocarbon layer or the lean layer result in a further concentration of p-xylene in the recovered fractions.

The particular method of recovering the hydrocarbons by acid decomposition, as set forth in the above example, is employed mainly as a convenient experimental procedure. In commercial operation, steam stripping of the clathrate will give efficient removal of the absorbed hydrocarbons while only slightly decomposing the complex, which may then be recycled without further treatment for use in another absorption stage.

EXAMPLE II

The procedure of Example I is repeated except that a mixture consisting of about 50% 2,3,4-trimethylpentane and 50% 2-ethyl hexane is employed as feed stock in place of the aromatic isomers. Upon decomposition of the clathrate with acid, a hydrocarbon phase is obtained which is substantially enriched in 2,3,4-trimethylpentane.

EXAMPLE III

A solid sample of the Werner complex of nickel thiocyanate and gamma picoline was prepared by adding four molar equivalents of gamma picoline to a 5% solution of nickel thiocyanate prepared as outlined in Example I. The solid precipitate was filtered off and dried at room temperature and then redissolved in chloroform to give a solution containing about 25% of the complex by weight. To this solution was added about an equal volume of a mixture of hydrocarbons containing ortho-, meta- and para-xylenes and ethylbenzene in the proportions given in Table 3 after feed mixture. Upon stirring the mixture at room temperature, a blue precipitate was formed which was removed by filtration. The residual hydrocarbons remained dissolved in the chloroform and were recovered by distillation. The precipitate was decomposed with aqueous hydrochloric acid and the resulting hydrocarbon phase was separated by decantation. Analysis of the hydrocarbon phase recovered gave the following results:

Table 3

|  | p-Xylene | m-Xylene | o-Xylene | Ethyl-benzene |
| --- | --- | --- | --- | --- |
| Feed Mixture, Percent by volume | 45.4 | 38.6 | 8.6 | 7.3 |
| Enriched Hydrocarbon phase, Percent by volume | 91.9 | 7.3 | 0.8 |  |

The above data shows that the concentration of p-xylene was approximately doubled by a single absorption step, and the total concentration of undesired isomers reduced to less than one-fifth the original proportion.

EXAMPLE IV

To a 10% aqueous solution of manganous nitrate is added four molar equivalents of gamma-picoline, and then about two molar equivalents of potassium cyanate. The resulting precipitate is removed by filtration, drained, dried in an air stream, and then redissolved in chloroform to give a saturated solution. To this solution is then added with stirring about an equal volume of a mixture consisting of about 65% cyclohexane and 35% methyl cyclopentane by volume. The resulting precipitate is removed by filtration, drained, dried in an air stream, and then distilled at about 110° C. and 20 mm. pressure. The overhead is condensed and found to consist predominantly of cyclohexane with some gamma-picoline. The hydrocarbons are separated from the picoline by acid washing, and analysis of the hydrocarbon fraction shows a substantial enrichment in cyclohexane.

EXAMPLE V

By repeating the procedure of Example I, substituting an equivalent amount of 4-methyl-1,3,5-triazine for the gamma-picoline, the concentration of p-xylene in the recovered hydrocarbon phase is approximately tripled in a single absorption cycle.

EXAMPLE VI 100 ml. of a mixture of xylene isomers and ethyl benzene having the composition listed in Table 3 after feed mixture was mixed with about 20 grams of the dry gamma-picoline complex of nickel thiocyanate prepared as outlined in Example III. The mixture was stirred at about 25° C. for three minutes, then filtered, yielding a clear colorless filtrate and a blue filter cake. The precipitate was decomposed in hydrochloric acid, yielding an enriched hydrocarbon phase. Analyses of the enriched phase and the lean hydrocarbon phase which remained as filtrate gave the following data:

Table 4

|  | p-Xylene | m-Xylene | o-Xylene | Ethyl-benzene |
| --- | --- | --- | --- | --- |
| Feed Mixture, percent by volume | 26.6 | 53.9 | 7.5 | 13.0 |
| Enriched Hydrocarbon phase, percent by volume | 41.7 | 40.2 | 3.5 | 14.6 |
| Lean Hydrocarbon phase, percent by volume | 23.9 | 55.9 | 7.8 | 12.4 |
| Precipitate, percent by weight | 20.2 | 19.2 | 1.7 | 7.2 |

This example shows the advantageous results obtainable by simply contacting the preformed complex with the mixture of isomers to be separated. A cyclic operation may be carried out for example by percolating the feed mixture, with or without an inert diluent or extender, through a bed of the complex, with periodic regeneration of the bed after it becomes saturated with absorbate. The regeneration may be accomplished by any of the methods outlined above such as steam stripping.

A continuous process may be exemplified by countercurrent contacting in a column wherein feed mixture enters near the bottom of the column, solid complex is sifted in near the top, a lean phase is withdrawn at the top, and the saturated complex is withdrawn at the bottom and subjected to steam stripping, solvent extraction or vacuum distillation for example, to recover the enriched phase. The stripped complex is then recycled, after dehydration if desired, to the absorption column.

In some cases it may be desirable to fractionally strip the clathrate in order to recover a plurality of enriched phases of varying purity, as outlined above and in the following example.

EXAMPLE VII

In order to illustrate the results obtainable by fractionally stripping a clathrate with steam, 100 grams of the gamma-picoline complex of nickel thiocyanate prepared as outlined in Example III is contacted with about 350 ml. of a mixture consisting of about 50% p-xylene, 30% m-xylene and 20% o-xylene by volume. After agitating the mixture for about five minutes at room temperature, the solid material is separated and drained, and the excess hydrocarbons are evaporated over a steam bath. The dry clathrate is then placed in a flask, and steam at about 100° C. is passed through the solid and thence through a condenser. Three separate fractions of condensate are collected at ten-minute intervals. The hydrocarbon phases of the fractions analyze approximately as follows:

*Table 5*

| Fraction | p-Xylene | m-Xylene | o-Xylene |
|---|---|---|---|
| 1, percent by volume | 65 | 25 | 10 |
| 2, percent by volume | 90 | 8 | 2 |
| 3, percent by volume | 95 | 4 | 0.5 |

Results analogous to the above are obtained when the clathrate is distilled under vacuum, or extracted with a solvent entrainer to selectively strip the clathrate.

EXAMPLE VIII

This example illustrates the use of an inert hydrocarbon thinner to facilitate liquid-solid contact in the clathration step.

*a. Preparation of complex*, Ni ($\gamma$-picoline)$_4$(SCN)$_2$.— To a stirred solution of 4.4 moles (410 g.) of 4-methylpyridine and 3500 g. of water contained in a stainless steel beaker was added from a dropping funnel over a 30 minute period a solution of 1.0 mole (237.8 g.) of NiCl$_2$.6H$_2$O and 2.0 moles (152.2 g.) of NH$_4$SCN in 1000 g. of water. Stirring was continued for an additional 15 minutes. The mixture was filtered and the precipitate reslurried for 30 minutes in a solution of 2000 g. of water and 200 g. of 4-methylpyridine. The mixture was again filtered and the precipitate spread on paper to dry. After approximately 20 hours the dry precipitate was passed through a 30 mesh sieve (U. S. Standard) and respread for further drying. The product was periodically weighed and when the net weight reached 105 percent (575 g.) of the theoretical yield (1 mole or 547.3 g.) the blue powder was stored in a closed container until used.

*b. Clathration procedure.*—The solid complex prepared as outlined is stirred at room temperature with the feed mixture plus a weight proportion of kerosene twice that of the Werner complex. The resulting clathrate is then filtered off and reslurried at room temperature with twice its weight of kerosene to remove adsorbed and/or weakly clathrated components. The washed clathrate is then filtered off and subjected to vapor stripping with kerosene at 180° C. to recover the clathrated xylene. The distillate is then fractionated to separate xylenes from the kerosene and $\gamma$-picoline. Employing a feed mixture which was 20% p-xylene, 45% m-xylene, 20% o-xylene and 15% ethylbenzene by volume, the following results are obtained at various clathration contact times:

*Table 6*

| Experiment | 1 | 2 |
|---|---|---|
| Werner complex/p-xylene weight ratio | 10.9 | 10.9 |
| Contact time, Min | 15 | 90 |
| Percent recovery [a] | 77.2 | 80.7 |
| Purity,[b] Vol. Percent | 64.4 | 56.6 |
| Efficiency,[c] Mole Percent | 36.4 | 38.0 |

[a] Mole-percent of feed p-xylene clathrated and recovered.
[b] Concentration of p-xylene in the clathrated hydrocarbons recovered.
[c] Moles of p-xylene clathrated per mole of Werner complex×100.

EXAMPLE IX

In a manner analogous to that described in Example VIII–a, a sample of the Werner complex [Mn(4-ethylpyridine)$_4$(SCN)$_2$] was prepared. This complex is slurried with kerosene plus feed xylenes for 60 minutes as described in Example VIII–b, and a p-xylene recovery of 50% is obtained, while the purity is approximately 50 volume-percent.

EXAMPLE X

This example illustrates the use of a solvent for the Werner complex in the clathration step, and also the separation of cymene isomers (isopropyl toluenes). Six grams of $\gamma$-picoline, 54 gms. of methyl cellosolve and 30 gms. of nickel tetra-($\gamma$-picoline) dithiocyanate are placed in a beaker and heated until complete solution is effected at 120° C. To the hot, clear solution is added 18 ml. of mixed cymenes. The hot solution is then cooled to 30° C. and the precipitated solid clathrate is removed by filtration. The solid phase and the filtrate are treated separately with dilute HCl, and the hydrocarbon phase formed in each case is recovered. The composition of feed and recovered hydrocarbons is as follows:

*Table 7*

| Sample | Composition of sample, Vol. percent | | | Percent Recovery |
|---|---|---|---|---|
| | p-cymene | m-cymene | o-cymene | |
| Feed | 50.0 | 14.7 | 35.3 | |
| Extract | 69.0 | 9.0 | 22.0 | 22 |
| Raffinate | 35.6 | 13.8 | 50.6 | |

When the above procedure is repeated omitting the excess $\gamma$-picoline, the solubility of the complex in the solvent is incomplete at the stated temperature, and the yield of p-cymene in the extract phase is less than about 10%. This example therefore demonstrates the beneficial effect on solubility and clathrating capacity of the complex when an excess of nitrogen base is employed. Preferably an excess of base amounting to about 0.1 to 0.6 part by weight per part of complex should be employed.

EXAMPLE XI

This example illustrates the separation of cymene isomers by contacting the same with the solid Werner complex in the presence of an aqueous dispersing medium, which may also serve as an immiscible entrainer for recovering the clathrated cymenes. In each of the experiments reported in Table 8, 50 gms. of powdered nickel tetra-$\gamma$-picoline dithiocyanate, 25 ml. of mixed cymenes, 99 ml. of water and 1 gm. of a non-ionic polyalkoxy benzene dispersing agent were placed in an 8 oz. bottle and agitated for various periods of time at about 24° C. At the end of the contact period, the contents of the flask were filtered to give a raffinate-filtrate and the solid clathrate. A small portion of the unwashed solid clathrate was then decomposed with aqueous acid to give a first hydrocarbon phase representative of what would be obtained by decomposing the clathrate without washing. The bulk of the solid clathrate was washed at 24° C. with another 100 ml. portion of aqueous dispersing agent. The washed clathrate was then decomposed with aqueous acid to yield a purified second hydrocarbon layer. The raffinate-filtrate was then subjected to steam-distillation at 100° C. to recover overhead the unclathrated, or raffinate, cymenes as a third hydrocarbon layer. All three of the recovered hydrocarbon fractions were then subjected to analysis by infra-red absorption spectrometry. The results were as follows:

Table 8

| Expt. | Contact time, Hrs. | Hydrocarbon fraction | Analysis, Vol. percent | | | p-cymene a Recovery, Percent |
|---|---|---|---|---|---|---|
| | | | p-cy-mene | m-cy-mene | o-cy-mene | |
| | | Feed | 50.1 | 15.8 | 34.1 | |
| 1 | 3 | 1-crude ext | 60.6 | 13.9 | 25.5 | 16.4 |
| | | 2-purif. ext | 93.8 | 3.1 | 3.1 | |
| | | 3-raffinate | 43.3 | 16.6 | 40.1 | |
| 2 | 26.5 | 1-crude ext | 84.2 | 7.9 | 7.9 | 35.0 |
| | | 2-purif. ext | 91.5 | 4.2 | 4.2 | |
| | | 3-raffinate | 38.4 | 19.9 | 41.7 | |
| 3 | 69.7 | 1-crude ext | 85.0 | 8.2 | 6.8 | 43.2 |
| | | 2-purif. ext | 91.0 | 4.5 | 4.5 | |
| | | 3-raffinate | 35.9 | 19.9 | 44.2 | | a Recovery figure is pro-rated to include aliquot of p-cymene recovered in crude extracts.

This example shows that, under the reaction conditions outlined, the clathration reaction reaches equilibrium at about 29 hours contact time. The weight-ratio of Werner complex to p-cymene was in all cases 4.65.

EXAMPLE XII

The procedure of Example XI is repeated, except that only 20 ml. of feed cymenes are employed, resulting in a weight-ratio of Werner complex to p-cymene of 5.8. The results were as follows:

Table 9

| Contact time, Hrs. | Hydrocarbon fraction | Analysis, Vol. percent | | | p-cymene Recovery, percent |
|---|---|---|---|---|---|
| | | p-cymene | m-cymene | o-cymene | |
| 72 | 1-crude ext | 81.5 | 10.8 | 7.7 | 64.9 |
| | 2-purif. ext | 92.9 | 7.1 | 0.0 | |
| | 3-raffinate | 25.6 | 17.0 | 57.4 | |
| | Feed | 50.1 | 15.8 | 34.1 | |

This example shows the improvement in recovery as a result of increasing the proportion of Werner complex.

EXAMPLE XIII

The procedure of Example XII is repeated except that instead of a purely aqueous dispersing medium, a mixture of 80% water and 20% methanol, by volume is employed. The recovery is slightly decreased at a contact time of 12 hours, but the clathration is found to reach equilibrium in about 4 hours. The purity is about 93%.

EXAMPLE XIV

A series of different Werner complexes were prepared by:

(1) Forming a first concentrated aqueous solution A containing one mole-proportion of the metal ion and two mole proportions of the anion desired in the final complex. In some cases heating was employed to obtain complete solution.
(2) Forming a second concentrated aqueous solution B containing four mole proportions of the nitrogen base desired in the final complex.
(3) Mixing solutions A and B.
(4) Cooling if necessary to precipitate the complex.
(5) Filtering and washing with water.
(6) Drying in an air stream at 24°–100° C.

The materials employed to furnish the desired metal ions and anions were as follows:

| Metal ion | Anion | Material employed |
|---|---|---|
| manganous | | manganous chloride. |
| ferrous | | ferrous sulfate. |
| nickelous | | nickelous chloride. |
| cobaltous | | cobaltous chloride. |
| | formate | formic acid. |
| | cyanide | sodium cyanide. |
| | chloride | manganous chloride. |
| | nitrite | sodium nitrite. |
| | cyanate | sodium cyanate. |
| | thiocyanate | sodium thiocyanate. |

The complexes so prepared, and some of their properties, are exemplified in the following table:

Table 10

| Werner complex | Color | Melting point, °C. |
|---|---|---|
| 1. Nickel tetra (3-cyanopyridine) dithiocyanate, 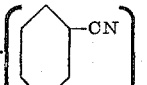 | Blue | 212°, d. |
| 2. Nickel tetra (3-amido-pyridine) dithiocyanate, 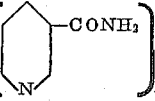 | do | 194°, d. |
| 3. Nickel tetra (ethyl isonicotinate) dithiocyanate, 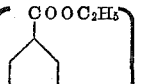 | Purplish blue. | 270°, d. |
| 4. Nickel tetra (4-ethyl pyridine) diformate, 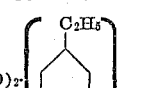 | Pale blue | 161°. |
| 5. Nickel tetra (4-hydroxymethyl-pyridine) dithiocyanate, 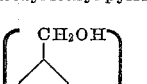 | Blue | 237°. |
| 6. Nickel tetra (4-methylpyridine) dinitrite, 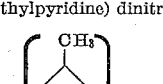 | do | 170°, d. |
| 7. Manganous tetra (4-ethylpyridine) dichloride, 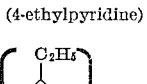 | Slightly pink. | 164°, d. |

| Werner complex | Color | Melting point, °C |
|---|---|---|
| 8. Manganous tetra (4-ethylpyridine) dicyanide, 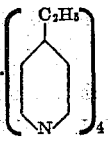 | Tan | 300°. |
| 9. Manganous tetra (4-ethylpyridine) dicyanate, 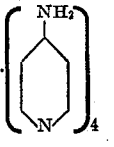 | do | 126°. |
| 10. Nickel tetra (3-ethyl, 4-methyl pyridine) dithiocyanate, 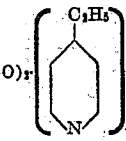 | Gray | 141°. |
| 11. Nickel tetra (4-acetylpyridine) dithiocyanate, 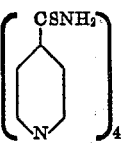 | Pale blue | 289°. |
| 12. Nickel tetra (4-cyanopyridine) dithiocyanate, 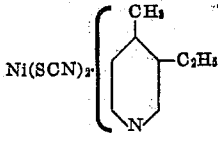 | Blue | 296°, d. |
| 13. Nickel tetra (methyl isonicotinate) dithiocyanate, 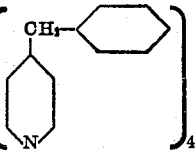 | do | 238°, d. |
| 14. Nickel tetra (4-methylpyridine) diformate, 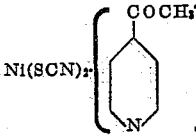 | do | 202°, d. |
| 15. Nickel tetra (isonicotinamide) dithiocyanate, 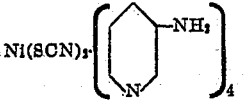 | Purple | 260°. |
| 16. Nickel tetra (3-bromopyridine) dithiocyanate, 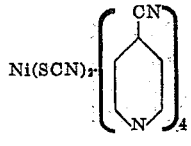 | Blue | 300°. |
| 17. Nickel tetra (4-aminopyridine) dithiocyanate, 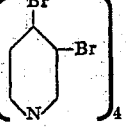 | Grey-blue | 252°. |
| 18. Nickel tetra (isothionicotinamide) dithiocyanate, 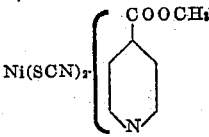 | Brown | 186°. |
| 19. Nickel tetra (4-benzylpyridine) dithiocyanate, 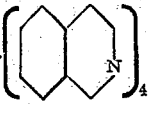 | Blue | 200°. |
| 20. Nickel tetra (3-aminopyridine) dithiocyanate, 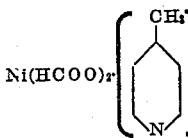 | do | 231°. |
| 21. Nickel tetra (3,4-dibromopyridine) dithiocyanate,  | Grey | 261°. |
| 22. Nickel tetra (isoquinoline) dithiocyanate, 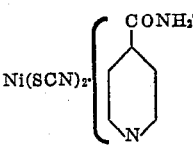 | Blue | |
| 23. Nickel tetra (4-vinylpyridine) dithiocyanate, 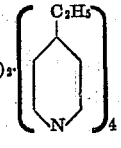 | do | |
| 24. Cobalt tetra (4-ethylpyridine) dithiocyanate, 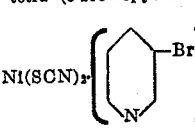 | Pink | |
| 25. Cobalt tetra (4-methylpyridine) dithiocyanate, 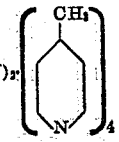 | do | |

| Werner complex | Color | Melting point, °C. |
|---|---|---|
| 26. Manganous tetra (4-ethylpyridine) dithiocyanate, Mn(SCN)$_2$·[C$_2$H$_5$-pyridine]$_4$ | White | |
| 27. Ferrous tetra (4-ethylpyridine) dithiocyanate, Fe(SCN)$_2$·[C$_2$H$_5$-pyridine]$_4$ | Tan | |
| 28. Ferrous tetra (4-methylpyridine) dithiocyanate, Fe(SCN)$_2$·[CH$_3$-pyridine]$_4$ | do | |

All of the above complexes are found to exhibit selective clathrating properties for aromatic compounds.

EXAMPLE XV

Representative complexes prepared by the procedure described in Example XIV were subjected to preliminary screening tests for selective clathrating properties with respect to a mixture of xylene isomers. The typical test procedure was carried out by dissolving about $3.27 \times 10^{-3}$ moles of the particular complex, $1.1 \times 10^{-5}$ moles of the corresponding nitrogen base, and $6.5 \times 10^{-2}$ moles of mixed xylenes in 8 ml. of methyl Cellosolve at reflux temperature. The mixture is then cooled in an ice bath, and the solid clathrate filtered off, washed with 5 ml. of isooctane, and then suspended in 10 ml. of isooctane. To the suspension is then added 6 ml. of dilute hydrochloric acid, which dissolves the solid and forms two liquid phases. The hydrocarbon phase is washed with three 10 ml. portions of water, dried over anhydrous sodium sulfate, and then anlyzed for xylene isomer distribution by ultraviolet absorption spectrometry. The results are summarized as follows:

*Table 11*

| | Vol. percent isomer distribution in clathrated hydrocarbons | | | | Isomer selectively clathrated |
|---|---|---|---|---|---|
| | p-xylene | m-xylene | o-xylene | Et. Bz. | |
| Initial xylenes | 19.9 | 45.5 | 19.3 | 15.3 | |
| Werner complex: | | | | | |
| 1. Ni(SCN)$_2$·(3-cyano-pyridine)$_4$ | 23.1 | 46.0 | 23.6 | 7.3 | para. |
| 2. Ni(SCN)$_2$·(3-amido-pyridine)$_4$ | 75.9 | 8.6 | 6.6 | 8.9 | para.[1] |
| Do | 26.4 | 43.1 | 18.0 | 12.5 | para.[2] |
| 3. Ni(SCN)$_2$·(ethylisonicotinate)$_4$ | 25.7 | 38.6 | 21.7 | 14.0 | para. |
| 4. Ni(HCOO)$_2$·(4-ethylpyridine)$_4$ | 8.0 | 20.1 | 53.1 | 18.8 | ortho. |
| 5. Ni(SCN)$_2$·(4-hydroxymethylpyridine)$_4$ | 21.7 | 42.6 | 35.7 | 0 | ortho. |
| 6. Ni(NO$_2$)$_2$·(4-methylpyridine)$_4$ | 18.5 | 43.6 | 23.6 | 14.3 | ortho. |
| 7. MnCl$_2$·(4-ethylpyridine)$_4$ | 14.9 | 39.4 | 37.9 | 7.8 | ortho. |
| 8. Mn(CN)$_2$·(4-ethylpyridine)$_4$ | 19.1 | 41.8 | 36.3 | 2.8 | ortho. |
| 9. Mn(CNO)$_2$·(4-ethylpyridine)$_4$ | 19.3 | 43.8 | 25.8 | 11.2 | ortho. |
| 10. Ni(SCN)$_2$·(3-ethyl-4-methylpyridine)$_4$ | 15.4 | 56.9 | 6.7 | 21.0 | meta. |
| 11. Ni(SCN)$_2$·(4-acetylpyridine)$_4$ | 11.5 | 23.5 | 10.4 | 54.6 | Et. Bz. |

[1] Excess base employed was 4-methylpyridine.
[2] No excess base employed.

EXAMPLE XVI

One part by weight of Werner complex No. 22 from Example XIV, Ni(SCN)$_2$·(isoquinoline)$_4$, was dissolved in 3 parts of chloroform, and 3.3 parts of mixed xylenes containing 16.5 vol. percent o-xylene was added. A precipitate formed which was filtered off at 25° C., washed and decomposed with acid. The liberated hydrocarbons were found to contain 27.6 vol. percent of o-xylene, showing a definite selectivity for the ortho isomer.

EXAMPLE XVII

One part by weight of Werner complex No. 23 from Example XIV, Ni(SCN)$_2$·(4-vinylpyridine)$_4$, was dissolved in 3 parts of chloroform, and 1 part of mixed xylenes containing 21.2 vol. percent of p-xylene was added. The precipitate was filtered off at 25° C., washed and decomposed with acid. The liberated hydrocarbons were found to contain 31.7 vol. percent of p-xylene, demonstrating a considerable selectivity for that isomer.

EXAMPLE XVIII

One part by weight of Werner complex No. 24 from Example XIV, Co(SCN)$_2$·(4-ethylpyridine)$_4$, was agitated at room temperature for several minutes with 2.2 parts of mixed xylenes containing 22.0 vol. percent of p-xylene. The resulting solid clathrate was found to comprise a clathrated hydrocarbon phase containing 45.7 vol. percent of p-xylene.

EXAMPLE XIX

One part by weight of Werner complex No. 25 from example XIV, Co(SCN)$_2$·(4-methylpyridine)$_4$, and 0.86 part of mixed xylenes containing 23.9 vol. percent of p-xylene were dissolved in 3.3 parts of propylene glycol at 135° C. The solution was then cooled to 30° C., filtered, and the precipitate decomposed to recover the cathrated hydrocarbons. Analysis showed the latter to contain 47.8 vol. percent p-xylene.

EXAMPLE XX

One part by weight of Werner complex No. 26 from Example XIV, Mn(SCN)$_2$·(4-ethylpyridine)$_4$, was agitated for several minutes at 25° C. with 3.5 parts of mixed xylenes containing 22.0 vol. percent p-xylene. The resulting solid clathrate was found to comprise a hydrocarbon phase containing 36.0 vol. percent p-xylene.

EXAMPLE XXI

One part by weight of Werner complex No. 27 from Example XIV, Fe(SCN)$_2$·(4-ethylpyridine)$_4$, was treated as described in Example XX. The clathrated hydrocarbons contained 46.5 vol. percent p-xylene, as compared to 23.0% in the feed.

EXAMPLE XXII

One part by weight of Werner complex No. 28 from Example XIV, $Fe(SCN)_2 \cdot (4$-methylpyridine) was agitated for several minutes at 25° C. with 2.18 parts of mixed xylenes containing 20.2 vol. percent p-xylene. The resulting solid clathrate was found to comprise a hydrocarbon phase containing 31.7 vol. percent p-xylene.

EXAMPLE XXIII

This example illustrates the separation of non-hydrocarbon isomers by selective clathration with nickel tetra-(4-methylpyridine) dithiocyanate. In each instance the clathration was carried out in a solvent consisting of 10 vol. percent 4-methylpyridine and 90 vol. percent methyl Cellosolve. The complex and the feed mixture were dissolved in the solvent and clathration was effected by cooling. The solid clathrates were then filtered off, washed once with fresh solvent, and subjected to steam stripping to remove the clathrated components, or extract. The weight-ratio of solvent/Werner complex was 2.0 in all cases. The results were as follows:

*Table 12*

| Isomeric mixture | Wt. ratio complex/p-isomer | Sample analyzed | Analysis, Wt. Percent | | | Recovery [1] |
| --- | --- | --- | --- | --- | --- | --- |
| | | | p-isomer | o-isomer | m-isomer | |
| 1. Chlorotoluenes, $CH_3C_6H_4Cl$ | 7.67 | Feed | 50.2 | 45.0 | 4.8 | |
| | | Extract | 91.4 | 7.8 | 0.8 | 35 |
| | | Raffinate | 38.6 | 56.7 | 4.7 | |
| 2. Dichlorobenzenes, $C_6H_4Cl_2$ | 3.08 | Feed | 52.8 | 47.2 | 0 | |
| | | Extract | 93.0 | 7.0 | | 34.8 |
| | | Raffinate | 37.5 | 62.5 | | |
| 3. Toluidines, $CH_3C_6H_4NH_2$ | 4.16 | Feed | 49.1 | 50.9 | 0 | |
| | | Extract | 68.4 | 31.6 | | 10.1 |
| 4. Nitrotoluenes, $CH_3C_6H_4NO_2$ | 3.47 | Feed | 50.0 | 50.0 | 0 | |
| | | Extract | 73.5 | 26.5 | | 7.0 |
| | | Raffinate | 47.6 | 52.4 | | |
| 5. Cresols, $CH_3C_6H_4OH$ | 3.75 | Feed | 50.0 | 28.4 | 21.6 | |
| | | Extract | 47.6 | 32.0 | 20.2 | ([2]) |
| | | Raffinate | 50.0 | 26.8 | 23.2 | |
| 6. Methylanisoles, $CH_3C_6H_4OCH_3$ | 2.75 | Feed | 52.2 | 47.8 | | |
| | | Extract | 94.4 | 5.6 | | 25.5 |
| | | Raffinate | 39.3 | 60.7 | | |

[1] Weight-percent of p-isomer introduced as feed recovered in extract.
[2] Acid-base reaction between cresol and 4-methyl pyridine inhibited clathration.

This example demonstrates the remarkable versatility of a single complex for resolving different isomeric mixtures. Similar separations are obtained with other Werner complexes, or other isomer mixtures.

EXAMPLE XXIV

Under the same conditions described in Example XXIII, a mixture of napthalene and diphenyl was subjected to selective clathration with the same Werner complex. The weight ratio of Werner complex/naphthalene was 3.02. The results were as follows:

*Table 13*

| Sample | Analysis, Wt. Percent | | Recovery |
| --- | --- | --- | --- |
| | Naphthalene | Diphenyl | |
| Feed | 48.6 | 51.4 | |
| Extract | 85.6 | 14.4 | 83.0 |
| Raffinate | 14.8 | 85.2 | |

This data shows a marked selectivity of clathration for naphthalene as opposed to diphenyl.

EXAMPLE XXV

Example XXIV was repeated using as feed a mixture of 1- and 2-methylnaphthalenes, and employing a weight-ratio of Werner complex/1-methylnaphthalene of 2.57. The results were as follows:

*Table 14*

| Sample | Analysis, Wt. Percent | | Recovery |
| --- | --- | --- | --- |
| | 1-methylnaphthalene | 2-methylnaphthalene | |
| Feed | 58.3 | 41.7 | |
| Extract | 81.3 | 18.7 | 43.0 |
| Raffinate | 45.5 | 54.5 | |

This data shows that 1-methylnahthalene is strongly clathrated in preference to 2-methylnaphthalene.

EXAMPLE XXVI 150 ml. of the potassium salts of a mixture consisting of about 60% m-cresol and 40% p-cresol is contacted with 75 grams of nickel-4-ethylpyridine azide [ni(4-ethylpyridine)$_4$(NNN)$_2$] by stirring for several minutes at room temperature. The solid material is removed and decomposed with hydrochloric acid. The organic phase which separates is found to be appreciably enriched in p-cresol.

EXAMPLE XXVII 50 grams of the potassium salts of a mixture consisting of 20% o-phthalic acid and 80% p-phthalic acid is dissolved in 200 ml. of anhydrous ethyl alcohol and about 30 grams of ferrous-quinoline-chloride

[Fe(quinoline)$_4$Cl$_2$]

is added. The mixture is agitated for about 10 minutes at 30° C., and the solid material removed by filtration and dried. Upon decomposition with aqueous hydrochloric acid, a solid precipitate forms which is found to be somewhat enriched in p-phthalic acid as compared to the original mixture.

EXAMPLE XXVIII

A mixture of 2-pentanol and 3-methyl-2-butanol is treated with nickel-ethylene diamine-thiocyanate [Ni(ethylene diamine)$_2$(SCN)$_2$]. The solid clathrate is recovered and decomposed with hydrochloric acid. The organic phase recovered thereby is found to be substantially enriched in 2-pentanol.

The above examples should be considered as illustrative of feasible separation methods for the various mixtures set forth. Obviously, the complexes mentioned in the examples may be employed for effecting separations of other mixtures, and may be interchanged in the various examples, to effect varying degrees of resolution. Likewise, many similar complexes could be substituted for those set forth in the examples.

From the foregoing it will be seen that the methods herein described provide broadly for the separation of a wide variety of organic compounds which differ in molecular configuration. The essential characteristic consists in contacting a Werner complex of a metal salt and at least one nitrogen base with a hydrocarbon or other organic compound which is absorbable into the crystal lattice of the complex, and recovering the absorbable into the crystal lattice of the complex, and recovering the absorbed component from the clathrate.

The methods described are of particular value for separating aromatic isomers, or other difficultly separable aromatic mixtures. The aromatic compounds exhibit a markedly greater tendency to form clathrates than do the non-aromatics. In all of the clathration procedures described and claimed herein, it will be understood that as an inherent and first pre-requisite for operativeness, the feed mixture to be resolved must be compatible with the Werner complex, i. e. must not chemically transform the Werner complex to other inoperative substances.

This application is a continuation-in-part of my previous application Serial No. 274,647, filed March 3, 1952, now abandoned.

The foregoing disclosure of this invention is not to be considered as limiting since many variations may be made by those skilled in the art without departing from the scope or spirit of the following claims.

I claim:

1. A process for resolving a mixture of organic compounds, said mixture including an aromatic compound differing in molecular configuration from another compound in said mixture, which comprises contacting said mixture with a solid Werner complex, whereby said aromatic compound is absorbed therein in preference to said other compound in said mixture, and thereafter recovering said selectively absorbed aromatic compound, said Werner complex consisting of one mole-proportion of a salt of a metal of atomic number above 12 coordinated with at least 2 mole-proportions of a heterocyclic nitrogen base.

2. A process as defined in claim 1 wherein said Werner complex has the general formula:

$$[X \cdot Z_y \cdot A_n]$$

wherein X is a metal having an atomic number above 12, Z is a heterocyclic nitrogen base, y is a number from 2 to 6, A is a monovalent negative radical, and n is a number from 1 to 3, and wherein said mixture of organic compounds comprises at least two aromatic hydrocarbons differing in molecular configuration, one of which is selectively clathrated.

3. A process defined in claim 1 wherein said Werner complex has the general formula:

$$[X \cdot Z_y \cdot A_n]$$

wherein X is a metal having an atomic number above 12, Z is a heterocyclic nitrogen base, y is a number from 2 to 6, A is a monovalent negative radical, and n is a number from 1 to 3, and wherein said mixture of organic compounds comprises at least two isomeric alkyl benzenes, one of which is selectively clathrated.

4. A process as defined in claim 1 wherein said Werner complex has the formula:

$$[X \cdot Z_y \cdot A_n]$$

wherein X is a metal having an atomic number above 12, Z is a heterocyclic nitrogen base, y is a number from 2 to 6, A is a monovalent negative radical, and n is a number from 1 to 3, and wherein said mixture of organic compounds comprises para-xylene and at least one member selected from the group consisting of ortho-xylene, meta-xylene and ethylbenzene.

5. A process as defined in claim 1 wherein said Werner complex is essentially nickel dithiocyanate coordinated with four mole-proportions of a heterocyclic nitrogen base, and wherein said mixture of organic compounds comprises paraxylene and at least one member selected from the group consisting of ortho-xylene, meta-xylene and ethylbenzene.

6. A process as defined in claim 1 wherein said Werner complex is essentially cobalt dithiocyanate coordinated with four mole-proportions of a heterocyclic nitrogen base, and wherein said mixture of organic compounds comprises para-xylene and at least one member selected from the group consisting of ortho-xylene, meta-xylene and ethylbenzene.

7. A process as defined in claim 1 wherein said Werner complex is essentially ferrous dithiocyanate coordinated with four mole-proportions of a heterocyclic nitrogen base, and wherein said mixture of organic compounds comprises para-xylene and at least one member selected from the group consisting of ortho-xylene, meta-xylene and ethylbenzene.

8. A process as defined in claim 1 wherein said Werner complex is essentially manganese dithiocyanate coordinated with four mole-proportions of a heterocyclic nitrogen base, and wherein said mixture of organic compounds comprises para-xylene and at least one member selected from the group consisting of ortho-xylene, meta-xylene and ethylbenzene.

9. A process as defined in claim 1 wherein said Werner complex has the general formula:

$$[X \cdot Z_y \cdot A_n]$$

wherein X is a metal having an atomic number above 12, Z is a heterocyclic nitrogen base, y is a number from 2 to 6, A is a monovalent negative radical, and n is a number from 1 to 3.

10. A process as defined in claim 9 wherein said negative radical is cyanide.

11. A process as defined in claim 9 wherein said negative radical is thiocyanate.

12. A process as defined in claim 9 wherein said negative radical is azide.

13. A process as defined in claim 9 wherein said negative radical is cyanate.

14. A process for resolving a mixture of organic compounds, said mixture including an aromatic compound differing in molecular configuration from another compound in said mixture, which comprises contacting said mixture with a solid Werner complex whereby said aromatic compound is absorbed therein in preference to said other compound in said mixture, and thereafter recovering said selectively absorbed aromatic compound, said Werner complex consisting of one mole-proportion of a salt of a metal of atomic number above 12 coordinated with at least 2 mole-proportions of a substituted pyridine base.

15. A process as defined in claim 14 wherein said metal is of atomic number 25 to 28.

16. A process as defined in claim 14 wherein said metal is of atomic number 25 to 28, and wherein said mixture of organic compounds comprises at least two aromatic hydrocarbons differing in molecular configuration, one of which is selectively clathrated.

17. A process as defined in claim 14 wherein said metal is of atomic number 25 to 28, and wherein said mixture of organic compounds comprises para-xylene and at least one member selected from the group consisting of ortho-xylene, meta-xylene and ethylbenzene.

18. A process as defined in claim 14 wherein said Werner complex is essentially nickel dithiocyanate coordinated with four mole-proportions of a substituted pyridine base, and said mixture of organic compounds comprises para-xylene and at least one member selected from the group consisting of ortho-xylene, meta-xylene and ethylbenzene.

19. A process as defined in claim 14 wherein said Werner complex is essentially cobalt dithiocyanate coordinated with four mole-proportions of a substituted pyridine base, and said mixture of organic compounds comprises para-xylene and at least one member selected from the group consisting of ortho-xylene, meta-xylene and ethylbenzene.

20. A process as defined in claim 14 wherein said Werner complex is essentially ferrous dithiocyanate coordinated with four mole-proportions of a substituted pyridine base, and said mixture of organic compounds comprises para-xylene and at least one member selected from the group consisting of ortho-xylene, meta-xylene and ethylbenzene.

21. A process as defined in claim 14 wherein said Werner complex is essentially manganese dithiocyanate coordinated with four mole-proportions of a substituted pyridine base, and said mixture of organic compounds comprises para-xylene and at least one member selected from the group consisting of ortho-xylene, meta-xylene and ethylbenzene.

22. A process for resolving a mixture of organic compounds, said mixture including an aromatic compound differing in molecular configuration from another compound in said mixture, which comprises contacting said mixture with a solid Werner complex, whereby said aromatic compound is absorbed therein in preference to said other compound in said mixture, and thereafter recovering said selectively absorbed aromatic compound, said Werner complex consisting of one mole-proportion of a salt of a metal of atomic number above 12 coordinated with at least 2 mole-proportions of a 4-substituted pyridine base.

23. A process as defined in claim 22 wherein said mixture of organic compounds comprises at least two aromatic hydrocarbons differing in molecular configuration, one of which is selectively clathrated.

24. A process for separating a mixture of hydrocarbon isomers comprising para-xylene and at least one member selected from the group consisting of ortho-xylene, meta-xylene and ethylbenzene, which comprises contacting said mixture with a solid Werner complex which is essentially a metal-$\gamma$-picolinothiocyanate, said metal having an atomic number above 12 whereby one of said isomers is selectively absorbed into the crystal structure of said Werner complex, and thereafter recovering the absorbed component from said complex.

25. A process as defined in claim 24 wherein said metal is nickel.

26. A process as defined in claim 24 wherein said metal is cobalt.

27. A process as defined in claim 24 wherein said metal is iron.

28. A process as defined in claim 24 wherein said metal is manganese.

29. A process for resolving a mixture of organic compounds, said mixture including an aromatic compound differing in molecular configuration from another compound in said mixture, which comprises contacting said mixture with a solid Werner complex at a temperature $T_1$ below about 65° C., whereby said aromatic compound is selectively absorbed into the crystal structure of said complex in preference to said other compound in said mixture, thereby forming a solid clathrate, stripping the solid clathrate, at a temperature substantially above $T_1$, with an inert liquid entraining agent in which said Werner complex is substantially insoluble, and subsequently recovering said selectively absorbed aromatic compound from said liquid entraining agent, said Werner complex consisting of one mole-proportion of a salt of a metal of atomic number above 12 coordinated with at least 2 mole-proportions of a heterocyclic nitrogen base.

30. A process as defined in claim 29 wherein said entraining agent is a paraffinic hydrocarbon which is a solvent for said absorbed aromatic compound.

31. A process as defined in claim 29 wherein said entraining agent is a predominantly aqueous dispersing agent which is substantially immiscible with said absorbed aromatic compound, and wherein said stripping is performed while agitating the mixture.

32. A process for resolving a mixture of organic compounds, said mixture including an aromatic compound differing in molecule configuration from another compound in said mixture, which comprises contacting said mixture with a solid Werner complex at a temperature $T_1$ below about 65° C., whereby said aromatic compound is selectively absorbed into the crystal structure of said complex in preference to said other compound in said mixture, thereby forming a solid clathrate, washing said solid clathrate with a first inert liquid entraining agent in which said Werner complex is substantially insoluble, said washing being carried out at a temperature not substantially above $T_1$, stripping the washed clathrate with a second inert liquid entraining agent in which said Werner complex is substantially insoluble, said stripping with said second entraining agent being performed at a temperature substantially higher than $T_1$, and subsequently recovering said selectively absorbed aromatic compound from said second entraining agent, said Werner complex consisting of one mole-proportion of a salt of a metal of atomic number above 12 coordinated with at least 2 mole-proportions of a heterocyclic nitrogen base.

33. A process as defined in claim 32 wherein said first and second entraining agents are paraffinic hydrocarbon solvents for said selectively absorbed aromatic compound.

34. A process as defined in claim 32 wherein said first and second entraining agents are essentially water, and are substantially immiscible with said selectively absorbed aromatic compound, and wherein said washing step and said stripping step are performed while agitating the respective mixtures.

35. A process for resolving a mixture of organic compounds, said mixture including an aromatic compound differing in molecular configuration from another compound in said mixture, which comprises dispersing said mixture in a substantially immiscible liquid medium thereby forming a dispersion, contacting and agitating said dispersion with a solid Werner complex whereby said aromatic compound is selectively absorbed into the crystal structure of said complex in preference to said other compound in said mixture, and recovering the selectively absorbed component from the resulting solid clathrate, said Werner complex consisting of one mole-proportion of a salt of a metal of atomic number above 12 coordinated with at least 2 mole-proportions of a heterocyclic nitrogen base.

36. A process as defined in claim 35 wherein said mixture of organic compounds comprises aromatic hydrocarbons, and wherein said dispersing agent is essentially water.

37. A process for resolving a mixture of organic compounds, said mixture including an aromatic compound differing in molecular configuration from another compound in said mixture, which comprises dispersing said mixture in a partially miscible liquid dispersing agent thereby forming a dispersion-solution of said mixture in said dispersing agent, contacting said dispersion-solution with a solid Werner complex whereby said aromatic compound is selectively absorbed into the crystal structure of said complex in preference to said other compound in said mixture, and recovering the selectively absorbed aromatic compound from the resulting solid clathrate, said Werner complex consisting of one mole-proportion of a salt of a metal of atomic number above 12 coordinated with at least 2 mole-proportions of a heterocyclic nitrogen base.

38. A process as defined in claim 37 wherein said mixture of organic compounds comprises aromatic hydrocarbons, and said dispersing agent comprises a mixture of water and an aliphatic hydroxy compound.

39. A process as defined in claim 37 wherein said mixture of organic compounds consists essentially of para-cymene plus at least one member selected from the group consisting of meta-cymene and ortho-cymene.

40. A continuous process for separating a mixture of aromatic hydrocarbons differing in molecular configuration which comprises passing said mixture upwardly through a contacting column, passing a solid Werner complex downwardly through said column, thereby effecting countercurrent contacting of said hydrocarbons with said Werner complex, removing lean hydrocarbons from the top of said column, removing a solid clathrate from the bottom of said column, recovering from said solid clathrate a hydrocarbon extract enriched in one of said aromatic hydrocarbons, and recycling the stripped Werner complex to said contacting column, said Werner complex having the general formula: $(X \cdot Z_y \cdot A_n)$, wherein X is a metal having an atomic number above 12, Z is a heterocyclic nitrogen base, $y$ is a number from 2 to 6, A is a monovalent negative radical, and $n$ is a number from 1 to 3.

41. A process according to claim 40 wherein said aromatic hydrocarbon mixture comprises para-xylene and at least one member from the group consisting of orthoxylene, meta-xylene and ethylbenzene, and said Werner complex consists essentially of a metal-$\gamma$, picolino-thiocyanate, said metal having an atomic number above 12.

References Cited in the file of this patent

UNITED STATES PATENTS

| | | |
|---|---|---|
| 2,578,054 | Fetterly | Dec. 11, 1951 |
| 2,596,344 | Newey et al. | May 13, 1952 |
| 2,606,214 | Higley et al. | Aug. 5, 1952 |
| 2,672,457 | Weedman | Mar. 16, 1954 |
| 2,676,167 | Findlay et al. | Apr. 20, 1954 |
| 2,681,337 | Gorin | June 15, 1954 |
| 2,714,586 | Lynch | Aug. 2, 1955 |

OTHER REFERENCES

J. Chem. Phys., vol. 18 (1950), pages 150–1. Article by Smith.

J. Chem. Soc. (London), 1952 (February), pages 319–28, page 325 needed. Article by Rayner et al.

J. Chem. Soc. (London), 1950, page 3346. Article by Evans et al.

J. Chem. Soc. (London), 1948, pages 61–73. Article by Powell.

Chemical Abstracts, vol. 45, page 3245 a–i (1951), original article by Bughalen et al.

Emeleus et al.: Modern Aspects of Inorganic Chemistry, D. Van Nostrand Company, Inc., 250 4th Ave., New York (1952), p. 104.